_United States Patent Office_  3,105,734
Patented Oct. 1, 1963

3,105,734
REMOVAL OF SILICA FROM URANIUM-CONTAINING SOLUTION
James L. Hart, Bartlesville, Okla., assignor to Phillips Petroleum Company, a corporation of Delaware
No Drawing. Filed Apr. 18, 1960, Ser. No. 22,690
8 Claims. (Cl. 23—14.5)

This invention relates to the recovery of uranium from uranium-bearing materials. In another aspect, it relates to the removal of silicon impurities from pregnant carbonate leach solutions containing soluble uranium values.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate and then causes the soluble uranium values to precipitate as sodium diuranate (this precipitate commonly called "yellow cake"). The solution containing the precipitated yellow cake is then thickened and separated, for example by filtering the thickened solution in a drum filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using, for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Many other metals, especially vanadium, and non-metallic elements, such as silicon, are commonly associated with uranium in uranium-bearing ores. These other metals and non-metals are commonly extracted with the uranium values in the carbonate leaching step. This invention is especially concerned with the removal of silicon-containing impurities from the pregnant carbonate leach solution, silicon contents being usually measured as $SiO_2$. If the silica content of such pregnant leach solution is not reduced, a substantial amount of the silicon impurity will be precipitated together with the uranium values during the subsequent precipitation of the soluble uranium values in the pregnant leach solution with caustic. As a result, an impure yellow cake product is obtained, and the $SiO_3$ content often will be undesirably high, e.g., 1 to 7 weight percent of the yellow cake.

The presence of the silicon impurity in the yellow cake is undesirable because it lowers the filtration rate of the yellow cake slurry during the subsequent separation step, and because it renders the subsequent conversion of the yellow cake into uranium metal or other uranium metal or other uranium compounds much more difficult. The Atomic Energy Commission, which purchases most of the yellow cake produced in this country, invokes a price penalty on producers of yellow cake if the purity of the yellow cake is not as high as desirable, and it may even refuse to purchase such impure yellow cake.

Thus, there has arisen a need for an improved method for producing a purer yellow cake having a relatively low silica content, e.g., a $SiO_2$ content of less than 2 weight percent of the yellow cake.

Accordingly, an object of this invention is to improve the recovery of uranium from uranium-bearing materials. Another object is to provide an improved method for recovering uranium values from uranium ores treated according to the carbonate leaching process. Another object is to reduce the silica content of pregnant carbonate leach solution. Another object is to produce a pure yellow cake product having a relatively low silica content. Other objects and advantages of this invention will become apparent to those skilled in the art from the following discussion and appended claims.

Briefly stated, I have discovered that the silica content of carbonate solutions containing the same together with soluble uranium values can be decreased by contacting such solutions with any soluble aluminum compound which will provide aluminum ions, $Al^{+++}$, and clarifying the resulting solution by separation therefrom of the resulting silicon-containing precipitate.

The aluminum compounds which are especially useful in the practice of this invention are those inorganic aluminum compounds which are soluble in aqueous alkaline solutions, such aluminum compounds representatively including aluminum hydroxide, aluminum oxide and the aluminum compounds of the strong mineral acids, such as aluminum chloride, aluminum fluoride, aluminum nitrate, aluminum sulphate, and the like, including the hydrates of such compounds.

In carrying out the process of this invention, the pregnant carbonate leach solution (which usually will contain 40–60 grams/liter $Na_2CO_3$ and 10–20 grams/liter $NaHCO_3$ and have a pH of 8–11) can be contacted with the aluminum compound in any convenient manner, such as by contacting the leach solution with the dry aluminum salt in comminuted form, or with a water solution, alkaline solution, or slurry of the aluminum compound. The contacting step can be carried out at any suitable temperature, generally at a temperature of from 20° C. up to the boiling point of the pregnant carbonate leach solution, the latter boiling point usually being around 103° C., and preferably at a contacting temperature above about 50° C. The time for the reaction between the aluminum compound and the soluble silicon compound, such as a silicate, in the leach solution will usually be within the range of from 10 minutes to 24 hours, although there is no fast rule in this respect. Generally the reaction will occur quite rapidly, with the consequent precipitation of a silicon-containing compound, such as aluminum silicate, thus it is not necessary to extend the reaction time over a long period.

The addition of the aluminum compound to the pregnant leach solution should take place at a point in the process prior to the precipitation of the soluble uranium values with caustic, since an object of this invention is to reduce the amount of silicon impurity in the yellow cake product. This addition of the aluminum compound is preferably carried out at a point upstream of the precoated filters which are ordinarily used in clarifying the pregnant leach solution prior to the precipitation step. Such addition of the aluminum compound will make it convenient to use the precoated filters for the additional purpose of clarifying the pregnant solution by removing therefrom the resulting precipitated silicon impurity. Any other means for separating the resulting precipitated silicon impurity can be employed, such as vacuum filters, centrifuges, or the like. It is preferred to carry out the separation step at the temperatures below 50° C., so that if an excess of the aluminum compound is used it will be possible to also separate out a precipitate of aluminum hydroxide, this latter precipitate forming below about 50° C. Thus, if during the contacting step elevated temperatures were employed, it may be necessary to cool the solution to a temperature below about 50° C. before carrying out the separation.

The amount of aluminum compound used according to this invention is, stated functionally, an amount sufficient to result in the precipitation of a substantial amount of the silicon impurity present in the leach solution. Generally, the amount of aluminum compound used will be that amount sufficient to provide an Al/Si molar ratio of from 0.2/1 to 4/1, preferably from 0.66/1 to 2/1.

Following the separation of the precipitated silicon-containing compound, the resulting clarified pregnant carbonate leach solution is treated with caustic in the usual manner to precipitate the soluble uranium values. The resulting slurry of yellow cake is then filtered in the usual manner, and the filtered yellow cake product dried, packaged, and stored or shipped. I have discovered that this filtration of the yellow cake slurry is much more rapid than that experienced heretofore where the pregnant leach solution was not treated according to my invention. More important, I have discovered that the yellow cake precipitate, resulting from the practice of this invention, has a materially lower silica content, below AEC penalty levels, this yellow cake product enjoying all the advantages accruing from such high purity.

The following examples are set forth to further illustrate objects and advantages of my invention, but these examples should not be construed so as to unduly limit this invention.

EXAMPLE I

A number of runs were carried out in which pregnant carbonate leach solution, containing soluble silicon compounds and soluble uranium values, were treated according to this invention with a soluble inorganic aluminum compound.

In these runs, a specified volume of pregnant carbonate leach solution from a commercial carbonate leaching mill was treated with various amounts of aluminum compound at a temperature of from 25 to 100° C. After adding the aluminum compound, the resulting mixture was stirred at the indicated temperature for 30 minutes. A precipitate formed almost immediately, and at the end of the 30-minute period, the resulting slurry was filtered, or, in some runs, the slurry was allowed to stand overnight. The runs which were allowed to stand overnight thus cooled to room temperature, and were filtered after this standing period.

After filtration, the filtrate was analyzed for silica content and compared to the silica content of the pregnant solution before treatment with the aluminum compound. The analyses before and after treatment with the aluminum compound were carried out colorimetrically using the technique of forming a silicomolybdate. The results of these runs are expressed as Table I.

In the above runs, the pregnant leach solution used in runs 1–7 contained 2.8 grams/liter $U_3O_8$, while the pregnant solution treated in run 8 contained 2.95 grams/liter $U_3O_8$. The pH of both solutions was approximately 9.7.

EXAMPLE II

A solution of 1.26 grams of $AlCl_3 \cdot 6H_2O$ in 10 ml. water was mixed with 550 ml. of commercial carbonate leach mill pregnant solution of an approximate pH of 9.7 which contained 0.132 gram/liter $SiO_2$ and 2.95 grams/liter $U_3O_8$. The resulting mixture was maintained for 30 minutes at 50° C., immediately after which the precipitate was filtered out. The filtrate contained 0.011 gram/liter $SiO_2$. An excess of NaOH over and above that necessary to neutralize the bicarbonate was then added to this filtrate to precipitate the uranium values as sodium diuranate. The yellow cake which precipitated contained 0.21% by weight $SiO_2$, while yellow cake precipitated from an untreated sample of the same pregnant liquor contained 2.75% by weight $SiO_2$.

EXAMPLE III

Several of the filtrates from Example I were combined to obtain a volume of treated pregnant carbonate leach solution of 1600 ml. This volume of pregnant carbonate leach solution was treated with sodium hydroxide to precipitate a yellow cake which analyzed 0.54% by weight $SiO_2$. Yellow cake which was precipitated from untreated mill solutions analyzed 3.1% by weight $SiO_2$.

EXAMPLE IV

Five thousand ml. of a commercial pregnant carbonate leach solution containing 2.95 grams/liter $U_3O_8$ and 0.132 gram/liter $SiO_2$ was treated with 4.5 grams of $$Al_2(SO_4)_3 \cdot 18H_2O$$

for 30 minutes at 25 to 35° C., immediately after which the precipitate which formed was filtered out. The filtrate from this filtration was not analyzed for silica content, but a yellow cake which was precipitated from this solution by addition of sodium hydroxide contained 0.31 weight percent $SiO_2$. Yellow cake which was precipitated from the same mill solution which had not been treated contained 2.75 weight percent $SiO_2$. Surprisingly, filtration rates on the yellow cake slurry resulting from the precipitation of the treated solutions were somewhat higher than the filtration rates on the yellow cake slurry resulting from the precipitation of untreated mill solution.

*Table I*

| Run No. | Reagent added | Grams reagent added | Mols reagent added | Ml. pregnant solution treated | $SiO_2$ content of pregnant solution, g./l. | Mols $SiO_2$ present in pregnant solution | Mol ratio, Al/Si |
|---|---|---|---|---|---|---|---|
| 1 | $Al_2(SO_4)_3 \cdot 18H_2O$ | 0.25 | 0.000375 | 550 | 0.196 | 0.0018 | 0.416 |
| 2 | $Al_2(SO_4)_3 \cdot 18H_2O$ | 0.2836 | 0.000426 | 400 | 0.196 | 0.00131 | 0.64 |
| 3 | $Al_2(SO_4)_3 \cdot 18H_2O$ | 0.5 | 0.00075 | 550 | 0.196 | 0.0018 | 0.832 |
| 4 | $Al_2(SO_4)_3 \cdot 18H_2O$ | 0.5 | 0.00075 | 550 | 0.196 | 0.0018 | 0.832 |
| 5 | $Al_2(SO_4)_3 \cdot 18H_2O$ | 0.5 | 0.00075 | 550 | 0.196 | 0.0018 | 0.832 |
| 6 | $Al_2(SO_4)_3 \cdot 18H_2O$ | 0.5 | 0.00075 | 550 | 0.196 | 0.0018 | 0.832 |
| 7 | $Al_2(SO_4)_3 \cdot 18H_2O$ | 2.0 | 0.003 | 550 | 0.196 | 0.0018 | 3.33 |
| 8 | $AlCl_3 \cdot 6H_2O$ | 0.25 | 0.00104 | 550 | 0.132 | 0.00121 | 0.86 |

Table I—Continued

| Run No. | Temp. of treatment, °C. | Time at treatment temp., minutes | Time of filtration | SiO$_2$ content of filtrate, g./l. | SiO$_2$ content of filtrate, mols | SiO$_2$ removed, percent |
|---|---|---|---|---|---|---|
| 1 | 100 | 30 | Stood overnight [1] | 0.088 | 0.000806 | 55.2 |
| 2 | 50 | 30 | Immediately | 0.026 | 0.0001735 | 86.7 |
| 3 | 50 | 30 | ___do___ | 0.017 | 0.000156 | 91.4 |
| 4 | 100 | 30 | Stood overnight [1] | 0.016 | 0.000148 | 91.8 |
| 5 | 25 | 30 | Immediately | 0.013 | 0.000119 | 93.5 |
| 6 | 50 | 30 | Stood overnight [1] | 0.012 | 0.00011 | 93.9 |
| 7 | 100 | 30 | ___do___[1] | 0.007 | 0.0000642 | 96.4 |
| 8 | 50 | 30 | Immediately | 0.101 | 0.0000916 | 92.5 |

[1] Allowed to cool to room temperature by standing overnight, after which the precipitate was filtered out.

Various modifications and alterations of this invention will become apparent to those skilled in the art, without departing from the scope and spirit of this invention, from the foregoing discussion, and it should be understood that this invention is not to be unduly limited to that set forth herein for illustrative purposes.

I claim:

1. A method for lowering the silica content of an alkaline carbonate solution containing soluble uranium values and soluble silicon impurities, which comprises contacting said solution with a soluble aluminum compound selected from the group consisting of aluminum oxide, aluminum hydroxide, the aluminum salts of strong mineral acids, and hydrates of said aluminum salts, and clarifying the resulting solution by separating therefrom the resulting silicon-containing precipitate.

2. In a carbonate leaching process for leaching uranium-bearing material, the improvement comprising contacting the pregnant carbonate leach solution containing soluble silicon impurities with a soluble inorganic aluminum compound selected from the group consisting of aluminum oxide, aluminum hydroxide, the aluminum salts of strong mineral acids, and hydrates of said aluminum salts, and clarifying the resulting solution by separating therefrom the resulting silicon-containing precipitate.

3. In a carbonate leaching process for leaching uranium-bearing material wherein said material is leached with an alkaline bicarbonate-carbonate leaching solution in a leaching zone, the resulting leach effluent from said leaching zone is filtered in a filtration zone, the resulting pregnant leach solution from said filtration zone is treated with sodium hydroxide to precipitate soluble uranium values, and the barren liquor resulting from the recovery of precipitated uranium values is recarbonated and recycled to the process, the improvement comprising adding a soluble inorganic aluminum compound to said pregnant leach solution to precipitate the silicon-containing impurities therein, said aluminum compound being selected from the group consisting of aluminum oxide, aluminum hydroxide, the aluminum salts of strong mineral acids, and hydrates of said aluminum salts, and clarifying the resulting solution by separating therefrom the resulting silicon-containing precipitate.

4. In a carbonate leaching process for leaching uranium bearing ore, wherein said ore is leached with alkaline carbonate-bicarbonate leaching solution, the resulting slurry of leached pulp and pregnant leach solution is filtered in a first filtration zone, the leached pulp retained in said filtration zone is washed with recarbonated barren liquor which is then recycled to said leaching step, the resulting pregnant leach solution is clarified and passed to a precipitation zone where soluble uranium values present in said pregnant leach solution are precipitated by the addition of aqueous sodium hydroxide thereto, the resulting slurry of precipitated uranium values is passed to a second filtration zone for the recovery of said precipitated uranium values, the overflow from said thickening zone comprising barren liquor is passed to a recarbonation zone, and the resulting recarbonated barren liquor is passed to said first filtration zone and used in washing said leached pulp, the improvement comprising adding to said pregnant leach solution a soluble inorganic aluminum compound selected from the group consisting of aluminum oxide, aluminum hydroxide, the aluminum salts of strong mineral acids, and hydrates of said aluminum salts, and clarifying the resulting solution by separating therefrom the resulting silicon-containing precipitate.

5. The method according to claim 4 wherein the amount of said added aluminum compound is sufficient to provide an Al/Si molar ratio in said leach solution in the range of 0.2/1 to 4/1.

6. The method according to claim 4 wherein the amount of said added aluminum compound is sufficient to provide an Al/Si molar ratio in said leach solution in the range of 0.66/1 to 2/1.

7. In a carbonate leaching process for leaching uranium-bearing material wherein said material is leached with an alkaline bicarbonate-carbonate leaching solution in a leaching zone, the resulting leach effluent from said leaching zone is filtered in a filtration zone, the resulting pregnant leach solution from said filtration zone is treated with sodium hydroxide to precipitate soluble uranium values, and the barren liquor resulting from the recovery of precipitated uranium values is recarbonated and recycled to the process, the improvement comprising adding aluminum sulfate to said pregnant leach solution to precipitate the silicon-containing impurities therein, and clarifying the resulting solution by separating therefrom the resulting silicon-containing precipitate.

8. In a carbonate leaching process for leaching uranium-bearing material wherein said material is leached with an alkaline bicarbonate-carbonate leaching solution in a leaching zone, the resulting leach effluent from said leaching zone is filtered in a filtration zone, the resulting pregnant leach solution from said filtration zone is treated with sodium hydroxide to precipitate soluble uranium values, and the barren liquor resulting from the recovery of precipitated uranium values is recarbonated and recycled to the process, the improvement comprising adding aluminum chloride to said pregnant leach solution to precipitate the silicon-containing impurities therein, and clarifying the resulting solution by separating therefrom the resulting silicon-containing precipitate.

References Cited in the file of this patent

UNITED STATES PATENTS

| | | |
|---|---|---|
| 1,437,191 | Paul | Nov. 28, 1922 |
| 2,750,253 | Smith | June 12, 1956 |
| 2,813,003 | Thomas et al. | Nov. 12, 1957 |
| 2,838,367 | Clark | June 10, 1958 |

OTHER REFERENCES

Clegg: "Uranium Ore Processing," pp. 306–323, 1958. (Copy POSL.)